(12) United States Patent
Mowry

(10) Patent No.: US 7,801,440 B2
(45) Date of Patent: Sep. 21, 2010

(54) SYSTEM AND METHOD FOR DIGITAL FILM SIMULATION

(76) Inventor: Craig Mowry, 95 S. Main St., Southampton, NY (US) 11968

( * ) Notice: Subject to any disclaimer, the term of this patent is extended or adjusted under 35 U.S.C. 154(b) by 946 days.

(21) Appl. No.: 11/473,570

(22) Filed: Jun. 22, 2006

(65) Prior Publication Data

US 2007/0002478 A1    Jan. 4, 2007

Related U.S. Application Data

(60) Provisional application No. 60/693,011, filed on Jun. 22, 2005, provisional application No. 60/696,829, filed on Jul. 6, 2005, provisional application No. 60/701,424, filed on Jul. 22, 2005, provisional application No. 60/702,910, filed on Jul. 27, 2005, provisional application No. 60/711,345, filed on Aug. 25, 2005, provisional application No. 60/710,868, filed on Aug. 25, 2005, provisional application No. 60/712,189, filed on Aug. 29, 2005, provisional application No. 60/727,538, filed on Oct. 16, 2005, provisional application No. 60/732,347, filed on Oct. 31, 2005, provisional application No. 60/739,142, filed on Nov. 22, 2005, provisional application No. 60/739,881, filed on Nov. 25, 2005, provisional application No. 60/750,912, filed on Dec. 15, 2005.

(51) Int. Cl.
*G03B 17/24* (2006.01)
*G03B 21/00* (2006.01)

(52) U.S. Cl. .................. 396/311; 396/315; 353/122

(58) Field of Classification Search .............. 396/311, 396/315; 348/97, 104; 358/527; 359/885; 353/122; 430/495.1
See application file for complete search history.

(56) References Cited

U.S. PATENT DOCUMENTS

| 1,912,582 | A | 6/1933 | Kelley ..................... 355/77 |
| 4,146,321 | A | 3/1979 | Melillo .................... 396/442 |
| 4,561,745 | A | 12/1985 | Kinsman et al. ........... 396/571 |
| 4,689,696 | A | 8/1987 | Plummer ................... 386/43 |
| 4,710,806 | A | 12/1987 | Iwai et al. ............ 375/240.01 |

(Continued)

FOREIGN PATENT DOCUMENTS

EP    1 014 112    6/2000

(Continued)

OTHER PUBLICATIONS

Patent Cooperation Treaty, "Notification of Transmittal of the Internaitonal Search Report and the Written Opinion of the International Searching Authority, of the Declaration," International Searching Authority, 2008, 10 pages.

(Continued)

*Primary Examiner*—Rochelle-Ann J Blackman
(74) *Attorney, Agent, or Firm*—Woodcock Washburn LLP

(57) ABSTRACT

The invention includes a system for imparting at least one characteristic of photographic emulsion to an image. The system includes a light transmissible medium at least partially provided with photographic film emulsion, wherein the photographic film emulsion is capable of being exposed and chemically processed. Furthermore, light that is related to an image is projected through a selected portion of the photographic film emulsion. Moreover, a containment is included for providing the light transmissible medium in a position relative to the projected light, wherein the image is imparted with the at least one quality related to the photographic film emulsion.

20 Claims, 5 Drawing Sheets

U.S. PATENT DOCUMENTS

| | | | |
|---|---|---|---|
| 4,727,425 A | 2/1988 | Mayne et al. | 358/523 |
| 5,140,414 A | 8/1992 | Mowry | 348/577 |
| 5,374,954 A | 12/1994 | Mowry | 348/121 |
| 5,406,326 A | 4/1995 | Mowry | 348/121 |
| 5,457,491 A | 10/1995 | Mowry | 348/104 |
| 5,687,011 A | 11/1997 | Mowry | 358/527 |
| 5,815,748 A | 9/1998 | Hamamura et al. | 396/104 |
| 5,940,641 A | 8/1999 | McIntyre et al. | 396/332 |
| 6,014,165 A | 1/2000 | McIntyre et al. | 348/64 |
| 6,143,459 A | 11/2000 | Vizard | 430/139 |
| 6,553,187 B2 | 4/2003 | Jones | 396/429 |
| 6,665,493 B2 | 12/2003 | Miyazaki et al. | 396/408 |
| 6,913,826 B2 | 7/2005 | Lee et al. | 428/402 |
| 6,929,905 B2 | 8/2005 | Gordon et al. | 430/361 |
| 2002/0057907 A1 | 5/2002 | Kamata et al. | 396/6 |
| 2003/0202106 A1 | 10/2003 | Kandleinsberger | 348/207.99 |
| 2003/0231255 A1 | 12/2003 | Szajewski et al. | 348/340 |
| 2005/0041117 A1 | 2/2005 | Yamagishi | 348/231.2 |
| 2005/0151838 A1 | 7/2005 | Fujita et al. | 348/39 |
| 2006/0082906 A1* | 4/2006 | Wang | 359/798 |

FOREIGN PATENT DOCUMENTS

| | | |
|---|---|---|
| GB | 01073 | 1/1916 |
| GB | 921 706 | 3/1963 |
| GB | 2 072 866 | 10/1981 |
| GB | 2 317 020 | 3/1998 |

OTHER PUBLICATIONS

"QuickTime VR Authoring Studio," *Apple Computer Inc., U.S.A.*, http://web.archive.org/web/20050329120354/http://manuals.info.apple.com/en/QuickTimeVR_AuthoringStudioUSerManual.pdf, Mar. 29, 2005, 108 pages.

* cited by examiner

SYSTEM AND METHOD FOR DIGITAL FILM SIMULATION

CROSS-REFERENCE TO RELATED APPLICATIONS

The present application is based on and claims priority to U.S. Provisional Application Ser. No. 60/693,011, filed on Jun. 22, 2005 and entitled "FILM SHEATH ASSEMBLY SYSTEM, METHOD AND APPARATUS FOR USE IN DIGITAL FILM SIMULATION," U.S. Provisional Application Ser. No. 60/696,829, filed on Jul. 6, 2005 and entitled "METHOD, SYSTEM AND APPARATUS FOR CAPTURING VISUALS AND/OR VISUAL DATA AND SPECIAL DEPTH DATA RELATING TO OBJECTS AND/OR IMAGE ZONES WITHIN SAID VISUALS SIMULTANEOUSLY," U.S. Provisional Application Ser. No. 60/701,424, filed on Jul. 22, 2005 and entitled "METHOD, SYSTEM AND APPARATUS FOR INCREASING QUALITY OF FILM CAPTURE," U.S. Provisional Application Ser. No. 60/702,910, filed on Jul. 27, 2005 and entitled "SYSTEM, METHOD AND APPARATUS FOR CAPTURING AND SCREENING VISUALS FOR MULTI-DIMENSIONAL DISPLAY," U.S. Provisional Application Ser. No. 60/711,345, filed on Aug. 25, 2005 and entitled "SYSTEM, METHOD APPARATUS FOR CAPTURING AND SCREENING VISUALS FOR MULTI-DIMENSIONAL DISPLAY (ADDITIONAL DISCLOSURE)," U.S. Provisional Application Ser. No. 60/710,868, filed on Aug. 25, 2005 and entitled "A METHOD, SYSTEM AND APPARATUS FOR INCREASING QUALITY OF FILM CAPTURE," U.S. Provisional Application Ser. No. 60/712,189, filed on Aug. 29, 2005 and entitled "A METHOD, SYSTEM AND APPARATUS FOR INCREASING QUALITY AND EFFICIENCY OF FILM CAPTURE," U.S. Provisional Application Ser. No. 60/727,538, filed on Oct. 16, 2005 and entitled "A METHOD, SYSTEM AND APPARATUS FOR INCREASING QUALITY OF DIGITAL IMAGE CAPTURE," U.S. Provisional Application Ser. No. 60/732,347, filed on Oct. 31, 2005 and entitled "A METHOD, SYSTEM AND APPARATUS FOR INCREASING QUALITY AND EFFICIENCY OF FILM CAPTURE WITHOUT CHANGE OF FILM MAGAZINE POSITION," U.S. Provisional Application Ser. No. 60/739,142, filed on Nov. 22, 2005 and entitled "DUAL FOCUS," U.S. Provisional Application Ser. No. 60/739,881, filed on Nov. 25, 2005 and entitled "SYSTEM AND METHOD FOR VARIABLE KEY FRAME FILM GATE ASSEMBLAGE WITHIN HYBRID CAMERA ENHANCING RESOLUTION WHILE EXPANDING MEDIA EFFICIENCY," U.S. Provisional Application Ser. No. 60/750,912, filed on Dec. 15, 2005 and entitled "A METHOD, SYSTEM AND APPARATUS FOR INCREASING QUALITY AND EFFICIENCY OF (DIGITAL) FILM CAPTURE," the entire contents of which are hereby incorporated by reference. This application further incorporates by reference in its entirety U.S. patent application Ser. No. 11/447,406, entitled "MULTI-DIMENSIONAL IMAGING SYSTEM AND METHOD," filed on Jun. 5, 2006, and U.S. patent application Ser. No. 11/408,389, entitled "SYSTEM AND METHOD TO SIMULATE FILM OR OTHER IMAGING MEDIA" and filed on Apr. 20, 2006, the entire contents of both of which are as if set forth herein in their entirety.

BACKGROUND OF THE INVENTION

1. Field of the Invention

The present invention relates to image capture and screening, and, more particularly, to an assembly system and method for infusing actual photographic film grain patterns physically, within other images, relating to digital film simulation.

2. Description of the Related Art

This invention relates to the simulation of video images originated on motion picture film stocks, from high definition video originated material stored on tape. Such simulation is described in U.S. Pat. Nos. 5,140,414, 5,374,954, 5,406,326, 5,457,491 and 5,687,011, all of which are incorporated by reference, as if set forth fully herein.

Film has been the preferred recording medium on which to originate many productions broadcast on television for years because of the sophisticated visual impression provided by the character of film stocks' color response and the general audience familiarity with the appearance resulting from filmed material presented on television; the resulting "look", a product of the photo-chemical process preceding the production of television signals representative of the image stored in the photo-chemical process, differs in several ways from video originated material of an identical photographic subject. Two key ways in which they differ are the focus of this invention: The color and grey scale component value response in each pixel of the resulting image on a television monitor; and the subtle visual impression made by the textured appearance of film grain, which is inherent to images stored within motion picture film emulsion.

Though color negative film has the ability to reproduce abundantly more color and gray scale gradients than video originated images, when video images are created from filmed images by means of a standard telecine "flying spot scanner" transfer, an illusion of the entire range of film's color response is maintained. This phenomenon, occurring within the scope of the video medium, provides that constants exist that can define the variation in pixel response between film and video originated images shot under identical lighting conditions, when viewed on video monitors: It is the combination of filmed information as it can be reproduced on a monitor that provides the overall maintenance of the "film look", and each separate color component combination of each pixel of film originated image is in fact available and employed by video originated images, though in response to a different photographic stimulus in almost every case.

The video data resulting from a telecine transfer defines filmed images in video terms, so the medium in question is in fact video, and the parameters and actual subtleties of projected filmed images are not the issue. Rather, the video data assigned to a resulting pixel representing a zone of film emulsion is an averaging process provided by video standards and color and grey scale gradients recognized as those registered and visible on standard television receivers.

Digital video technology has provided that digital data defines video images and encodes the color and grey component values for each pixel in addressable sequences, able to be "read" and "rewritten" into a store. Therefore, given uniform and predominantly shadow-free lighting and even color temperature during original videotaping, and careful slating of this data for each shot in foot candles and degrees kelvin respectively, digital data logged from pixel response of color data originally stored in film stock emulsion, under the same light intensity and color temperature conditions, can be referenced according to principal videographic variables and inserted in place of the original video color data. This would create an aesthetic comprise that permits approximation of potentially any film stock's anticipated response to the same stimulus represented in video form.

Existing technology for the printing industry and digital video provide for scan-sequential and specifically addressed pixel component modifications according to look-up-table data, as the system of the present invention employs, (i.e. U.S. Pat. Nos. 4,727,425; 4,710,806).

High definition imaging systems and projection systems capable of manifesting a high definition compatible number of scanning lines provide the means for executing a process whereby actual film grain within celluloid emulsion can be married with a projected image, and videographed with a loss in image clarity low enough to produce a final result which provides a film "look" to images at an aesthetically acceptable sacrifice to the original high definition integrity of the video images. Present systems strive to simulate film grain appearances digitally, with a result that is visibly different from actual film grain appearances on monitors, following a telecine "transfer." By incorporating the general videography-of-film operating basis of telecine devices, projection and imaging units (including selected camera(s)) configured to work in tandem can capture all or aspects of an image as it is projected on a grey or other selected resulting emulsion surface following selective exposure and photochemical processing, of optional size. Selectively, different emulsion grain pattern density and grain pattern results may be created to be contained within a containment and this containment may occur in a variety of configurations. For example, Mowry discloses in U.S. Pat. No. 5,140,414 a sheath configuration including roller containment aspects in part for positioning and providing a selected portion of a selected emulsion relative to a projected image. The grain density and the grain patterns as well as the size of the emulsion area to be married with a projected image, (such as one originated digitally for example,) are included within the variables potentially affecting resulting impression visually of aspects of film stock being simulated; such aspects may include film gauge size, film ASA or "speed," and film exposure level.

Currently, no system or method exists in the prior art to provide this physical film grain infusing approach as a separate and distinct system, nor does prior art provide an emulsion containment configuration that provides for a continual, selectively one direction transport means for providing such film grain infusing emulsion within the path of image, including images projected as electronically manipulated light. Herein, the range of such potential continual configurations, (requiring no change in the emulsion bearing media's intermittently transported direction,) is exemplified in the drawings, by the circular disc (or "wheel") configuration, containing specifically exposed and processed photographic film stock, varying selectively as circular strips occupying a selected amount of the overall disc radius.

SUMMARY

The invention includes a system for imparting at least one characteristic of photographic emulsion to an image. The system includes a light transmissible medium at least partially provided with photographic film emulsion, wherein the photographic film emulsion is capable of being exposed and chemically processed. Furthermore, light that is related to an image is projected through a selected portion of the photographic film emulsion. Moreover, a containment is included for providing the light transmissible medium in a position relative to the projected light, wherein the image is imparted with the at least one quality related to the photographic film emulsion.

Other features and advantages of the present invention will become apparent from the following description of the invention that refers to the accompanying drawings.

BRIEF DESCRIPTION OF THE DRAWINGS

For the purpose of illustrating the invention, there is shown in the drawings a form which is presently preferred, it being understood, however, that the invention is not limited to the precise arrangements and instrumentalities shown. The features and advantages of the present invention will become apparent from the following description of the invention that refers to the accompanying drawings, in which.

DESCRIPTION OF THE EMBODIMENTS

This invention relates in part to the simulation of video images, including digital images, originated on motion picture film stocks, from high definition video originated material stored on tape. Such simulation is described in U.S. Pat. Nos. 5,140,414, 5,374,954, 5,406,326, 5,457,491 and 5,687,011, all of which are incorporated by reference, as if set forth fully herein. Further, this invention provides physical image affecting means involving (in one configuration) the physical incorporation of actual processed photographic film emulsion grain patterns into images projected on or through actual, specifically exposed, photographic film.

As used herein, the term, "texture" refers, generally to the disposition or manner of union of the particles of a body, including an image or substance.

In accordance with the teachings herein, a multi-strip, multi-density film emulsion bearing device is configured selectively as a disc and includes a plurality of different densities that are preferably formed to occupy the space between selected circles within the wheel, according to the selected radius the circular strips will occupy. The multi-density film emulsion bearing disc preferably spins intermittently, and is usable in a configuration, or in front of a digitally projected image (such as in theatre) wherein the film emulsion bearing disc occurs in front of, or behind the lens of the projector. Thus, when the projector projects, digital images are infused selectively with aspects of real film grain from real emulsion, as embodied in the disc shaped film emulsion bearing device; (which, as noted above, has selectively wide circles of emulsion embodying distinct aspects, including grain pattern and density.) The disc configuration option does not limit further containment configuration options, as the issue pertains to the selected device functioning in tandem with an image providing device, such as a projector, to position actual film grain within processed film stock in the path of the projected image, whether before or after the image is subjected to selected optical components, such as a projector lens.

Figure 1:
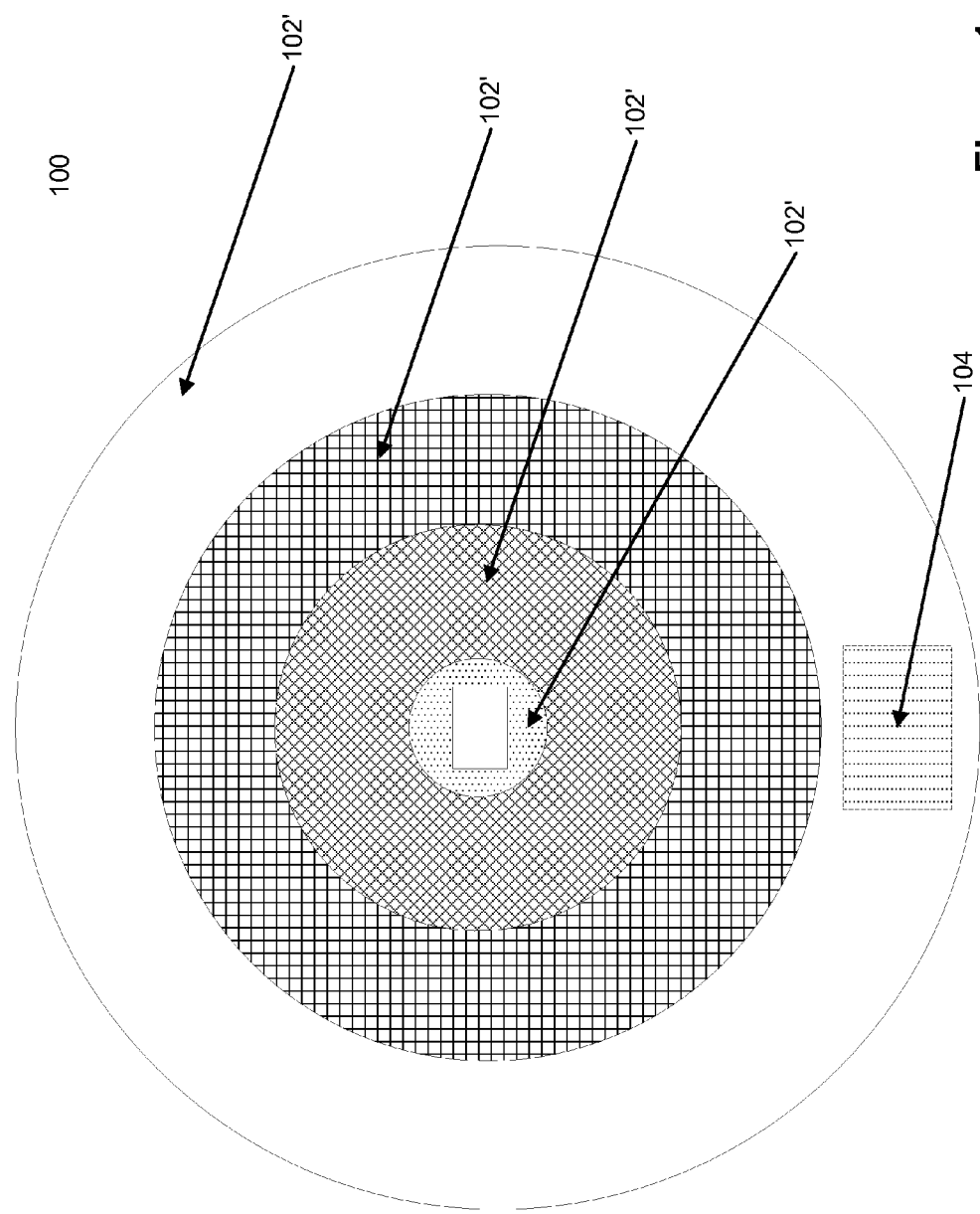
FIG. 1 illustrates, multi-density film emulsion bearing disc having a plurality of concentric rings that are positioned at selective radii within the disc in accordance with an embodiment.

Referring now to the drawings, in which like reference numerals refer to like elements, FIG. 1 illustrates, multi-density film emulsion bearing disc 100 having a plurality of concentric rings 102' that are positioned at selective radii within disc 100. Each respective ring 102' varies in at least one aspect with respect to film emulsion, such as density or darkness, size of film grain, and varying amounts of emulsion. Also shown in FIG. 1, visual 104 is projected on and/or through disc 100. At any given instant, an image provider, such as a projector, casts projected visual 104 on and/or through disc 100, and as the next visual loads, disc 100 advances selectively to a new portion of emulsion which varies from the previous in at least one aspect, including grain pattern.

As shown in FIG. 1, each ring 102' represents darker strips of emulsion, which are less exposed. The darker strips of emulsion may include a more dense grain and pattern to infuse into digital images that are otherwise lacking grain. In the example shown in FIG. 1, the order of the varying rings relate to their respective aspects, such as equivalent film gauge sizes relative to an area of emulsion, and the density of film grain patterns. The selectable configuration of various embodiments enable the aspects to intersect a visual 104.

Figure 2:
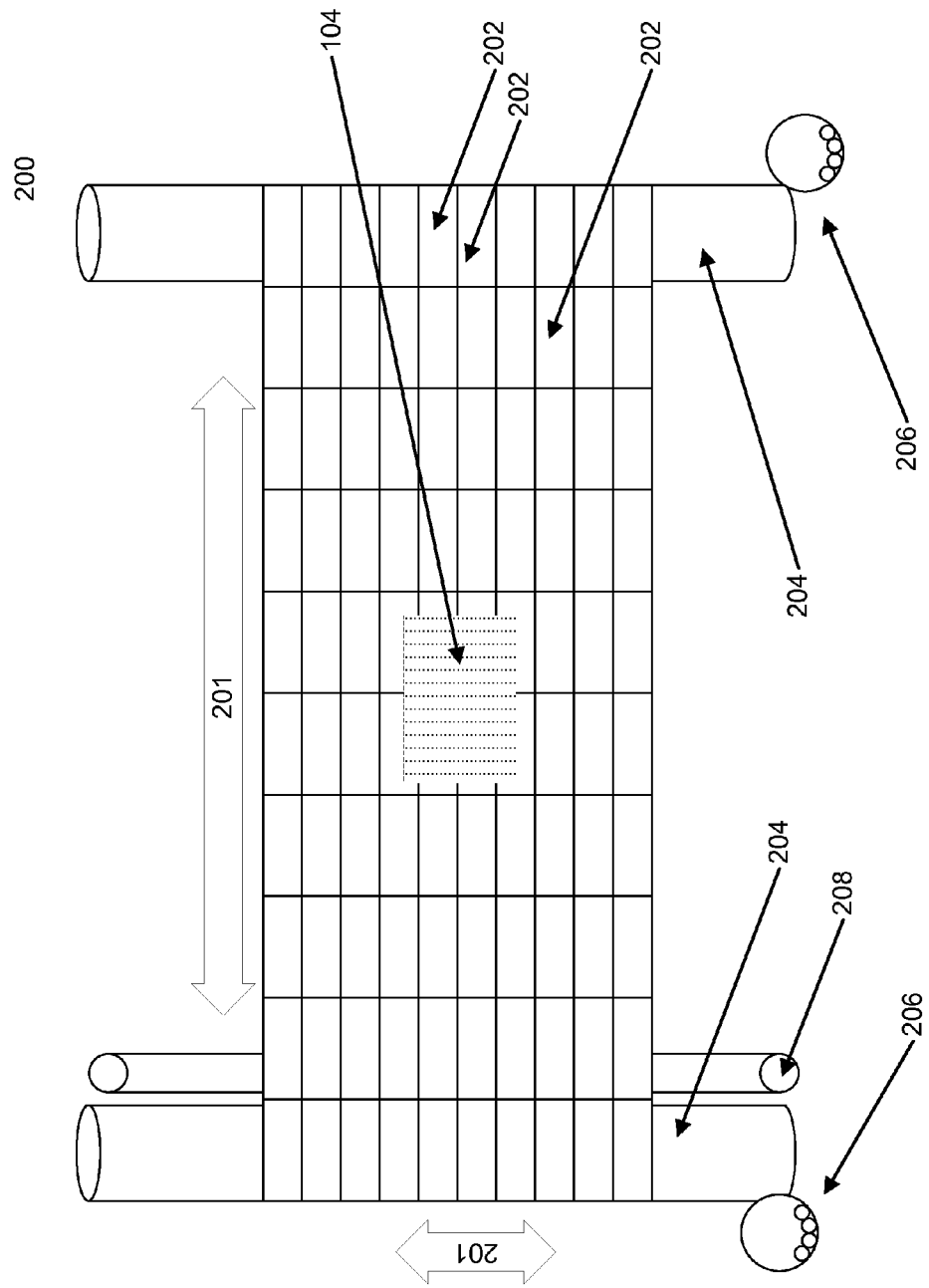
FIG. 2 shows an alternative embodiment that includes a multi-density emulsion bearing surface device.

FIG. 2 illustrates an alternative embodiment that includes a multi-density emulsion bearing surface device 200 that includes a multi-density emulsion bearing surface 201 having a plurality of emulsion strips 202'. In one embodiment, the multi-density emulsion bearing surface is a length of motion picture film stock that is spooled. Strips 202' are similar to concentric rings 102' (FIG. 1) in that each strip 202' varies in at least one aspect with respect to film emulsion, such as density or darkness, size of film grain, and varying amounts of emulsion. Further, each strip 202' inherently has varying grain patterns, as indicated within the vertical lines shown in surface 201. The vertical lines indicating varying inherent grain patterns within each strip 202' shown in FIG. 2 are merely illustrative, and are not meant to limit the invention fixed, squared regions of varying film grain patterns.

Continuing with reference to FIG. 2, the horizontal double-sided arrow indicates that surface 201 is operable to move intermittently from left to right. The horizontal multi-density emulsion bearing surface is preferably collected or provided on multi-density emulsion bearing surface containment rollers 204. Either roller 204 is preferably operable to provide or collect surface 201 thereby operable in reversible directions. In other words, either roller 204 may operate to gather or release surface 201. Also shown in FIG. 2, drive 206 provides torque and is operable to turn rollers 204, and to cause surface 201 to actuate. Further, FIG. 2 shows multi-density emulsion bearing surface device base 206. In the embodiment shown in FIG. 2, track 208 is provided to enable vertical motion of surface 201, as indicated by the vertical double-sided arrow. In an alternative embodiment, device 200 may be provided with two additional rollers 204 that cause surface to be collected or provided vertically, thereby eliminating a need for a track on which surface 201 actuates. Of course, one skilled in the art will recognize that many variations and alternative embodiments are foreseen herein.

Figure 3:
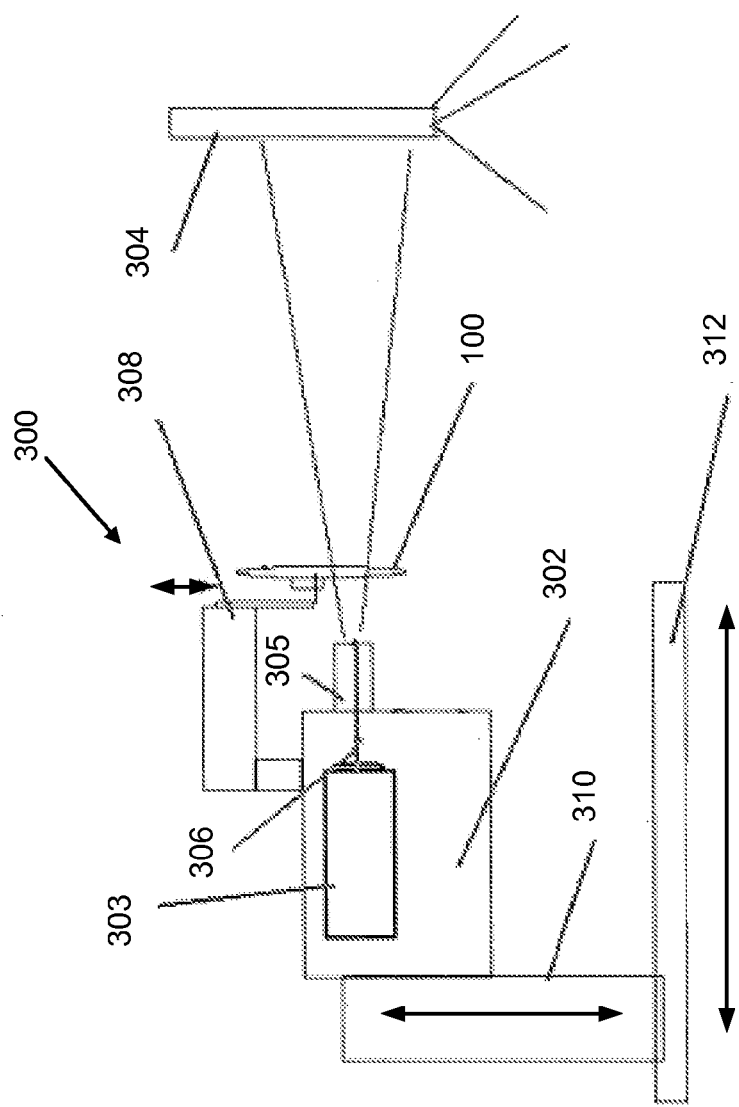
FIG. 3 displays an embodiment that shows a digital projection apparatus in accordance with an embodiment.

FIG. 3 illustrates an embodiment that shows a digital projection apparatus 300 that includes a projector 302 projecting an visual 104 (not shown) through disc 100 and on image manifest surface 304, such as a screen. Projector 302 preferably includes initial image projection element 303 for generating light based on image data. Projector 302 further comprises lens 305, through which light 306 related to the generated image passes. In the embodiment shown in FIG. 3, disc 100 actuates via disc rotation and repositioning device 308 (as indicated by the vertical, double-sided arrow). Further, projector 302 is operable to actuate via projector repositioning unit 310 (as indicated by the vertical, double-sided arrow within repositioning unit 310). Further, projector stand 312 is provided for projector 302, and may be provided such that projector 302 can be actuated, for example, to modify the projected size of visual 104 (as indicated by the horizontal double-sided arrow).

Thus, as shown in the embodiment in FIG. 3, a visual projects through disc 100 to provide aspects of film emulsion.

Figure 4:
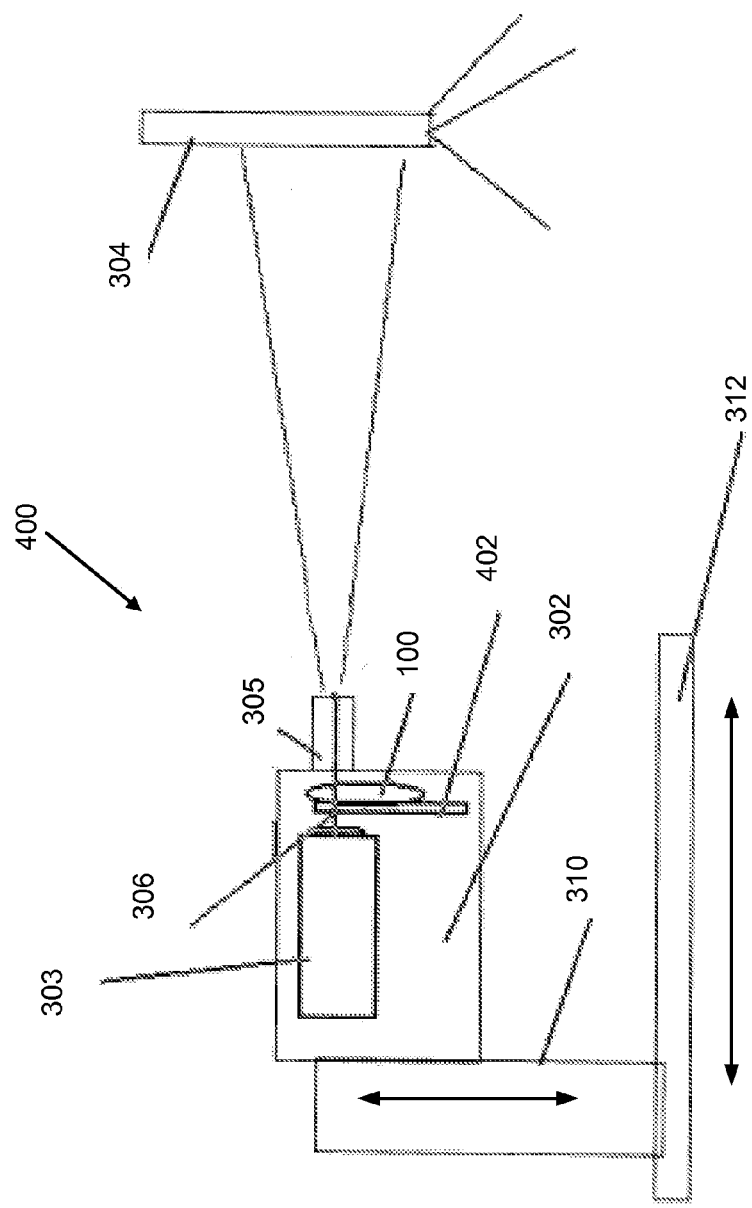
FIG. 4 illustrates an alternative embodiment of a digital projection apparatus.

FIG. 4 illustrates an alternative embodiment of a digital projection apparatus 400 that provides disc 100 and disc rotation and repositioning device 402 within projector 302. In the embodiment shown in FIG. 4, disc rotation and repositioning device 402 is positioned such that light 306 is provide through disc 100 prior to passing through lens 305. In this way, projector 302 contains all the elements for providing aspects of film emulsion for visuals 104 projected through disc 100.

Figure 5:
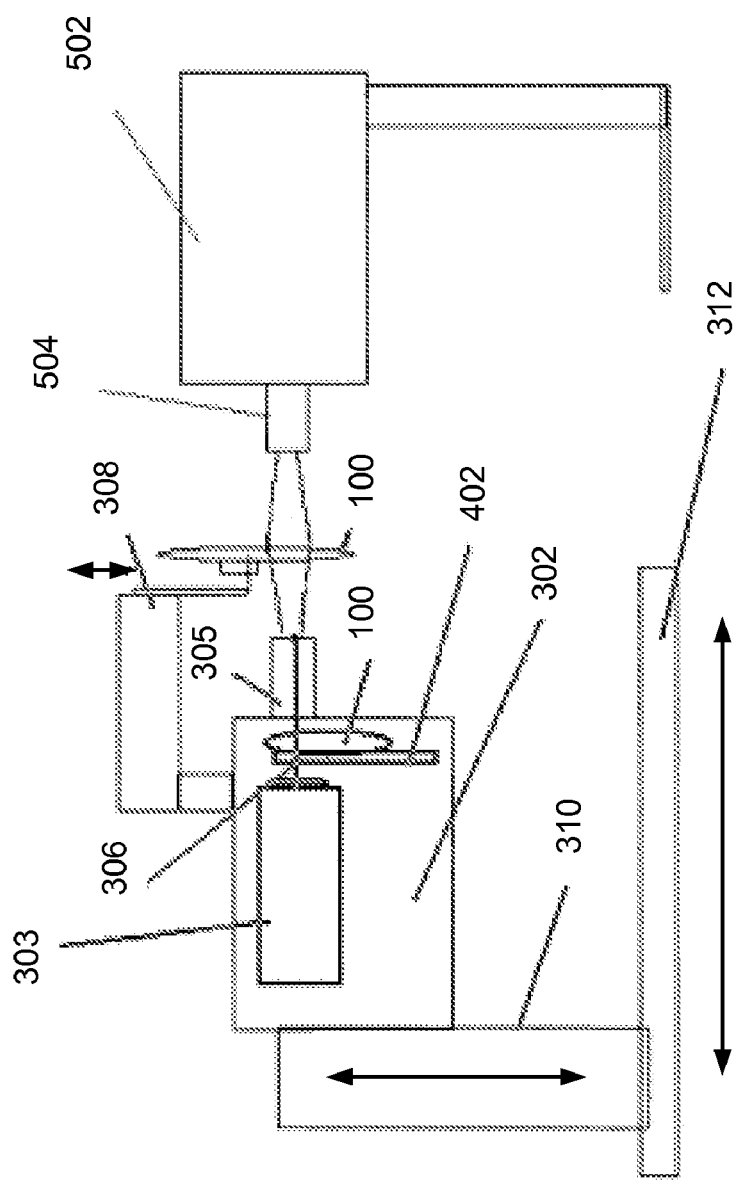
FIG. 5 shows an alternative embodiment in which a camera captures a projected simulated filmed visual.

FIG. 5 illustrates an alternative embodiment in which camera 502 captures the projected visual 104 from apparatus 300 or apparatus 400. In the example shown in FIG. 5, disc 100 is shown twice, one coupled to repositioning device 308 and one coupled to device 402. The inclusion of two discs 100 is meant to illustrate that either embodiment (300 or 400) may be used with camera 502. Alternatively, both discs 100 may be provided and operate in tandem, Visual 104 (not shown) is projected via projector 302 and through disc 100, and preferably captured through lens 504 of camera 502. This embodiment enables the capture of a simulated film visual.

Thus, the present invention comprises a variety of approaches and aspects related to simulating film originated visuals from digital and/or video originated material. Such approaches to film grain simulation are disclosed. The present invention comprises a film sheath, such as described in U.S. Pat. No. 5,140,414 (the "'414 patent"), and involves a visual derived from a digital or other storage means to be manifest on actual exposed and processed motion picture film. This enables the visual, which can be projected or imposed on to the actual film emulsion by other means, to be married with the film emulsion on the exposed motion picture or other processed, photosensitive and/or grain embodying material.

The emulsion on which a projected visual is manifest may include motion picture film, and may have selectable degrees of grain density and/or size, with the visual manifest on a selectively small portion of film stock, or other texture embodying material (which need not be processed film or photosensitive material, or emulsion).

The grain embodying material (in the form of the sheath, as described in the '414 patent) may selectively be advanced to allow for subsequent visuals to be manifest on portions of this material embodying a different, or new grain pattern.

Capture of the married visual, (image with the film grain in the material on which the image is manifest), is an optional configuration which may occur through conventional CCD, or other imaging or scanning means selectively synched with the mechanism(s) providing the visual (and/or projecting it) on the grain embodying material.

The assembly of this invention may take many forms. For example, actual grain embodying material, such as exposed and processed motion picture film of a selected type, providing grain embodying surface(s) on which to impose visuals of optional size and brightness for capture, selectively by means placed on the reverse side of the material (such as film) from the image providing means (such as a projector).

The material, if exposed and processed motion picture or photographic film, may be of any type and may involve exposure to varying gradients of gray scale or other stimuli affecting the grain pattern, size and density result. The means is provided to select a "strip" or area of emulsion for example of a selectively "darker" type, with the projector compensating with increased brightness and/or an compensation means by the capture device on the reverse side (to not necessarily allow for change in the visual's brightness in imposing selectively dense film grain in it literally.) The means is further provided to move or vary the imposing selectively dense film grain into it literally. The means is further provided to move or vary the material to provide a different and/or new zone of grain embodying material in line for the next visual to be manifest and captured (selectively by opposite sides of the selectively transparent material).

The processed motion picture film, or other material selectively, would thus be selectively light transmissible after processing, allowing for an image manifest on its emulsion layer to be captured or scanned from the other side of this emulsion layer.

Further, exposed and processed film may be selectively subject to gray scale gradient charts or other stimuli before processing, to achieve the desired result of the material for the process herein. Clearly, capture of only the light transmissible material which receives light (not an image) projected through it, would allow for today's technology to record a sequence of actual digitized frames of actual digitized frames of captured "film grain emulsion" or "grain patterns" of optional brightness or other visual qualities, for digital marrying with visuals not literally projected on the material, but subsequently married in the digital realm with the grain patterns recorded literally from the film, at another time.

Thus, the present invention, relating most specifically but not exclusively to film origination simulation from digital originated material provides the use of film or other selectively light transmissible material, embodying grain or other desired aspects, in the literal imposing of captured film grain or other desired qualities for screening or other imaging applications.

Thus, visuals may be literally manifest on the material, (such as gray scale gradient processed film stock) or may be later married with captures of such gray scale or other selected gradients of film stock (resulting from specific creation as a component of this system,) or other material, in the digital realm and post production.

Further, configurations may forego the prior art projector and camera set up, for synonymous digital image manifesting means (similar perhaps to those in digital film recorders) with more advance image capture means in the post production realms, similar to those in datacine and related devices that scan film for digitization (e.g., telecine devices).

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. A system, comprising:
   an imaging unit configured to project light indicative of images through a circular light transmissible medium at least partially provided with photographic film emulsion including a grain pattern, wherein the circular light transmissible medium is configured to impart a portion of the grain pattern on the light indicative of the images as it passes through the circular light transmissible medium; and
   a component configured to rotate the circular light transmissible medium to change the portion of the grain pattern the light indicative of the images passes through.

2. The system of claim 1, wherein the light transmissible medium is celluloid.

3. The system of claim 1, further comprising an imaging device that selectively recaptures aspects of the projected light after it passes through the light transmissible medium.

4. The system of claim 1, wherein the light transmissible medium includes zones of distinct emulsion including different grain patterns.

5. The system of claim 1, wherein the light transmissible medium is photographic film having a predetermined length and width.

6. The system of claim 5, wherein the component is operable to rotate the light transmissible medium in more than one direction.

7. The system of claim 1, wherein the imaging unit is a projector.

8. The system of claim 1, wherein the projected light is projected through a variable amount of the photographic film emulsion.

9. The system of claim 1, wherein the light is projected such that the images are resized.

10. The system of claim 1, wherein the images are resized via at least one of a camera optical setting, an imaging unit generating the light, and the light transmissible medium.

11. The system of claim 1, wherein the images are resized by configuring an optical zoom setting.

12. The system of claim 1, wherein the circular light transmissible medium is positioned relative to a projector lens.

13. The system of claim 1, wherein the circular light transmissible medium is positioned within the imaging unit.

14. The system of claim 1, wherein the circular light transmissible medium is positioned relative to the projected light that includes at least continual or intermittent transport of the light transmissible medium relative to the projected light.

15. A method, comprising:
    rotating a circular light transmissible medium that includes photographic film emulsion having a grain pattern; and
    projecting light indicative of images through at least a portion of the circular light transmissible medium.

16. The method of claim 15, wherein the light indicative of the images is projected through at least the portion of the circular light transmissible medium toward a screen.

17. The method of claim 15, wherein the light indicative of the images is projected through at least the portion of the circular light transmissible medium toward a charged coupled device array.

18. The method of claim 15, wherein the light indicative of the images is projected through the entire circular light transmissible medium.

19. A system, comprising:
    a charged couple device array configured to receive light indicative of digital images that were projected through at least a portion of a rotating circular light transmissible medium including photographic film emulsion having a grain pattern; and
    a tangible computer readable storage medium configured to store the light received by the charged couple device array.

20. A system comprising:
    means for projecting light indicative of a digital image through a circular transparent medium including photographic film emulsion having a grain pattern;
    means for rotating the circular transparent medium; and
    means for storing at least a portion of the light indicative of the digital image after it passes through the circular transparent medium.

* * * * *